United States Patent
Fahrner (10) Patent No.: US 9,677,541 B2
(45) Date of Patent: Jun. 13, 2017

(54) METHOD AND APPARATUS FOR BRAKING A WIND TURBINE IN CASE OF EMERGENCY

(71) Applicant: Fritz Fahrner, Moritzburg OT Boxdorf bei Dresden (DE)

(72) Inventor: Fritz Fahrner, Moritzburg OT Boxdorf bei Dresden (DE)

(73) Assignee: SETEC GmbH, Moritzburg OT Boxdorf (DE)

( * ) Notice: Subject to any disclaimer, the term of this patent is extended or adjusted under 35 U.S.C. 154(b) by 797 days.

(21) Appl. No.: 13/971,863

(22) Filed: Aug. 21, 2013

(65) Prior Publication Data

US 2014/0241879 A1  Aug. 28, 2014

(30) Foreign Application Priority Data

Feb. 23, 2013  (EP) .................................... 13156489

(51) Int. Cl.
*F03D 7/02* (2006.01)
*F03D 7/04* (2006.01)

(52) U.S. Cl.
CPC ......... *F03D 7/0244* (2013.01); *F03D 7/0208* (2013.01); *F03D 7/0224* (2013.01); *F03D 7/0248* (2013.01); *F03D 7/0264* (2013.01); *F03D 7/04* (2013.01); *F05B 2260/845* (2013.01); *F05B 2260/902* (2013.01); *Y02E 10/723* (2013.01)

(58) Field of Classification Search
CPC .... F03D 7/0244; F03D 7/0264; F03D 7/0248; F05B 2260/845; F05B 2260/902
See application file for complete search history.

(56) References Cited

U.S. PATENT DOCUMENTS

| | | | | |
|---|---|---|---|---|
| 3,667,861 A | * | 6/1972 | Parish | F03D 7/0248 416/14 |
| 6,428,274 B1 | * | 8/2002 | Hehenberger | F03D 7/0244 416/153 |
| 7,261,517 B2 | * | 8/2007 | Uphues | F03D 7/0224 416/153 |
| 7,398,867 B2 | * | 7/2008 | Agardy | F03D 7/0244 188/18 A |
| 8,864,464 B2 | * | 10/2014 | Diaz de Cerio Garcia de Mendaza | F03D 7/0248 188/71.1 |
| 9,470,208 B2 | * | 10/2016 | Nies | F03D 7/0248 |
| 2011/0272224 A1 | * | 11/2011 | Yan | F03D 7/06 188/72.1 |

* cited by examiner

*Primary Examiner* — Mary A Davis (74) *Attorney, Agent, or Firm* — Michael Soderman (57) ABSTRACT

The invention is based on the problem of creating an additional device to act as a "secondary emergency device" in the case that one or more standard emergency devices fail to adjust the blade angle of one or multiple rotor blades into a position of power limitation. The method of braking a wind turbine in an emergency by adjusting the rotor blades for wind turbines with power control via the principle of pitch control or active stall control and of holding the position of a rotor blade for each rotor blade with at least one actuator and at least one holding brake is a redundant measure for an emergency. This enables one or more holding brakes to open depending on the rotor-blade direction that is required and to close or to be kept closed when an adjustment of a rotor-blade direction is not desired.

13 Claims, 4 Drawing Sheets

METHOD AND APPARATUS FOR BRAKING A WIND TURBINE IN CASE OF EMERGENCY

CROSS REFERENCE TO RELATED APPLICATIONS

This application claims the benefit of European Application No. EP 13156489.0 filed on Feb. 23, 2013; this application is incorporated by reference herein in its entirety.

BACKGROUND

The present invention relates to a wind turbine with a rotor hub and at least one rotor-blade connected to a pivot-bearing. By at least one electrical, pneumatic and/or hydraulic actuator, each rotor-blade can be rotated on its longitudinal axis and can be held in a defined position by means of a brake, whereat the brake is connected to the actuator. There is at least one gear box connected to the actuator, which rotates on a pivot-bearing. The pivot-bearing comprises an inner and outer ring, wherein one ring is screwed onto the hub and the other one connects the rotor blade. By rotating the ring, to which the blade is mounted on, the rotor blade can be rotated in its longitudinal axis. This ring may be the outer or the inner ring of the bearing. In order to limit the energy caused by the wind in case of an emergency, or to interrupt or reduce the energy generation, the rotor blade is turned into the position in which a lower amount of wind power is absorbed by the rotor. In order for each blade to be provided with a self-sufficient rotation about its longitudinal axis, even on failure of the mains supply, each drive has one or more independent energy storages, which in case of an emergency, provide one or more rotor blade drives (actuators) on each rotor blade, with energy and release one or more holding brakes.

The rotor blade pitching of a wind turbine is used for speed control (power control) of the turbine at the range of nominal power, and also as an aerodynamic braking system. Therefore each rotor blade has one or more actuators. To achieve this with the pitch system, it is rotated to an angle between vane position and working position, and with the system using the principle of active-stall into the opposite direction to stall.

In case of a failure it is advantageous to turn all rotor blades into the position with a low power generation if possible. A version of existing systems for rotor blade pitch comprises one or more electric drive-modules for each rotor blade, including one or more connected actuators, which are equipped with one or more holding brakes to keep the position. This allows for each blade to be pitched and held at position individually. However, nearly at all known actuators, the holding brakes of rotor blades are designed so that the disconnection of the brake control leads to the blocking of the actuator shaft and thus there is the risk that the blade-pitch cannot or can only be performed insufficiently, if, for example, a cable-connection to a brake has been interrupted. Especially in the case that an actuator does not deliver any torque, the corresponding rotor blade stays in its maximum working position. In a system working with active brakes, there is the disadvantage that they cannot keep the rotor blade from rotating into the direction in which a further rotation of the rotor takes place, in the event that the actuation of the brake-coils is not possible.

Consequently a malfunction of the rotor blade pitch-drive can cause a critical situation for the entire wind turbine. In particular, exceeding the permissible rotor speed can cause danger to people or a substantial or total damage to the wind turbine.

According to the state of the art technology, brakes used in the drive-train for pitch-drives are executed in such a way, that the brake-coil with friction lining is fixed, for example to the motor housing, and the brake-hub is rotating together with the motor shaft, and thus a closing of the brake consequently stops the motor shaft and the associated gear and rotor-blade. However, one or more brakes on an actuator system for the rotor-blades, may as well be, for example connected between the motor and gearbox or via geared-belt-drive to the rotor-blade.

The WO 99/23384 describes an apparatus for adjusting of rotor-blades at a rotor-hub of a wind turbine, which has a drive for rotating the rotor-blades. The rotor-blade adjustment can also be used as a braking system for shutdown of the wind turbine by turning the rotor-blades towards vane position, and so reducing the power, respectively speed, of the wind turbine. In order to ensure the slow-down of the wind turbine by the pitch-system, even in the event of a power loss, a switchable return stop is connected to the rotor blades, to block the motor-shaft which prevents the rotor blades to turn from vane position into working-position. The return stop is deactivated during failure-free operation and is automatically activated at failure of power supply, which causes the blades to only be able to turn into vane position and be kept there.

In the document EP 1 763 126 B1 a device for controlling the blade angle of a rotor-blade of a wind turbine is described, wherein the device contains the following components: a pitch control system with a power converter, a DC voltage circuit with capacitor for power supply to the pitch control system, an AC power source for energy supply to the DC voltage circuit and an alternative buffer battery for power supply to the control system in case of AC power failure.

The different versions of these suggestions have significant negative impacts, such as e.g. the system with switchable freewheel has the disadvantage that the full motor-torque has to be blocked, causing a rigorous blocking in one direction and that it requires an additional coupling for activation, or an auxiliary power supply. The systems using a passive brake do not feature a redundant emergency method respectively do not describe a truly redundant emergency apparatus, in case of an error at the actuator system, e.g. damaged actuator, or when a brake fails to release.

The object of this invention is to provide an additional device, means a "redundant emergency apparatus for each rotor blade", in the event that one or more standard emergency devices because of a failure, do not adjust the pitch-angle of one or more rotor-blades into a position of power limitation.

These problems shall be solved in the way that each available brake is opened or is kept open, as soon as a torque on the rotor-blades longitudinal axis attempts to rotate the rotor-blade in the direction of a decreasing driving torque for the rotor, and in the case of a torque trying to move the rotor-blade into the maximum working position, this rotary movement shall be stopped already at the beginning, anyhow an adjustment to the aerodynamic braking position (vane position) is carried out for the corresponding rotor-blade.

SUMMARY

Method and apparatus for braking of a wind turbine in case of emergency. The underlying purpose of the invention is to create an additional apparatus as a "second emergency apparatus", in the case that one or multiple standard emergency devices are, because of an error, failing to adjust the rotor-blade angle of one or multiple rotor blades, into a position of power limitation. The method to decelerate a wind turbine in case of an emergency by adjusting the rotor blades for wind turbines with power control by the concept of pitch control or active stall control, and for each rotor blade with at least one actuator and at least one holding brake to secure the position of one rotor blade, includes a redundancy for emergency, in order to open one or multiple holding brakes (10), which fixate the rotor blade (29) against pitching, depending on the required rotor blade direction of turning, the brake resp. the brakes opens resp. open, and in case of a unwanted direction of rotation, the holding brake resp. the holding brakes (10) closes resp. are closing or kept closed.

The inventive devices contain at least one actuator (13), once with at least one active holding brake (10), and once with at least one passive holding brake (10), and each with corresponding parts for fulfilling the function of the apparatus.

DETAILED DESCRIPTION

When the actuator is used for active-stall system, the rotation of each rotor blade for aerodynamic braking of the rotor is done in the direction of stall. In normal operation the auxiliary device shall have no influence on the operation and the costs of the system shall be affected only marginally.

The function is achieved by the inventive method and the inventive mechanism, which in case of disturbed emergency adjustment of one or more rotor-blades, the necessary aerodynamic braking by turning the blades is obtained nevertheless by a controlled opening or closing of the holding brakes, depending from which direction of the rotor-blade longitudinal axis a torque is originated.

These functions are achieved after shut-off of an solenoid, which has connection to one or more brakes which are available at one or more devices of each rotor-blade actuator, that in the version "passive braking" has a manual release-lever for forced opening and in the version "active braking" has a brake lever for a forced close of the brake when necessary. To achieve this, the passive brake is mounted in such a way that its housing can be rotated at a small angle, and after the lack of application of force at the manual release lever, after the shut-off of the solenoid, a rotation of the brake housing can be executed. This connection allows an adjustment of the manual release lever on the passive brake by spring or by bar and detection of the rotational direction, or automatically when the friction pad is closed, to the direction of lever position "brake mechanically released", and operates the mechanically actuated releasing of the brake pad when required.

With an active brake, a switch-off of the solenoid also causes the release of the rotation of the brake housing by the release of a lock lever, and in dependence of the rotary direction of the actuator, the activation or release of the brake is effected by adjusting of at least one brake lever as a brake-closing lever, by spring force and the detection of rotational direction. In the event that with the passive brake, a torque arises from the rotor-blade in the direction of maximum working position, the rotatable mounted brake-housing, including a respective end-stop on the right and left, by a rocker lever, which is turned by the rotation of a carrier on the drive-shaft, is turned away from the end-stop, so that the manual release lever, which is connected to the rotation, is set back into neutral position, and consequently the brake pads close. As long as the torque for the rotor blade rotation in the direction of work-position is available, the manual release lever is held in position "neutral" by the closed friction pad of the brake, because of the torque having turned the brake housing in the direction, which brings the manual release lever into neutral position, using the rotation of the brake housing.

In the case that an actuator does not generate a torque, the torque which is generated by gravitational force, as well as cyclic with the rotor rotation originating from the rotor blade longitudinal axis is used, at the pitch system to adjust the rotation of the rotor-blade to the direction of vane position, and with the active-stall system it is turned in direction of increasing stall. When using an active brake, the shutdown of the solenoid causes no rotational movement of the brake housing, or respectively the brake housing not being pulled into the position without activation of the brake lever, when the rotor-blade is turning in the direction of reduced wind energy generation. When changing the direction of rotation, the spring force that held the hand brake lever, is eliminated immediately by a rocker lever, and turning the brake housing, together with the pushing or pulling of the hand brake lever into the position "brake closed" and is held there as long as the direction of the available torque on the drive or the rotor-blade has not been changed, the brake housing and thus the brake lever associated with the rotational movement of the brake housing is held in position "brake closed".

The operation of the invention of the described system of a wind turbine comprises the following cases:

a) During each automatic start of the wind turbine a functional test of the redundant mechanical brake-release is executed. This is performed in dependence of the rotor position and carries out a service request, if test fails.

b) When using a passive brake, as soon as the mechanical release of the brake has turned the rotor-blade, towards the direction of reduced torque generation by the rotor, an end-stop sensor will set back the hand-lever of the brake to the neutral position, so that the angular motion of the rotor-blade is stopped. A functional check of the redundant and direction-dependent release of the rotation, can be done by the controller for activation and deactivation of the solenoid and thus of the manual release.

c) When a active brake is used, at reaching a position of the rotor blade in that a low torque at the rotor is occurring, the brake hub is moved by a mechanical probe in such a way that the brake closes and the rotor blade rotation stops.

d) Shutting off the solenoid at one drive in a situation of failure in the emergency system releases the mechanical brake control, i.e. the opening and closing is dependent on the rotational direction of the motor shaft and the release of the direction of rotation is depending on the selected version of the pitch-system, and the driving direction, so that the adjustment decelerates the rotor.

e) In case of using an electric drive system, each converter (for controlling a pitch motor) continuously performs a torque-check, which is used to detect an activated brake (fixing the position), or also to detect an increase in torque, required to rotate a rotor-blade, and for example as a result bringing the wind turbine to a safe operating condition. Thereby also a possibly increased torque is detected during the angle adjustment. If the actuator is working against the not opened brake, the controller independently deactivates the locking (turns off the solenoid) to initiate the redundant mechanical release of the brake depending on the rotational direction. When using an active brake (means not fixing position at power-off) an identified drive-blocking is corrected by a second deactivation function of the brake supply voltage, and thus likewise the brake is closed or opened, as a function of the torque direction.

f) The mechanical opening of the passive brake can be mechanically locked during transport, assembly, installation and service work. For service work, a non-positive locking of the rotation is available at the second shaft of the motor. When using active brakes, a closing of the brake can be realized by mechanical device, by the locking of the brake-lever, at cases where there is no power supply for the brake or in case of a dysfunction of power supply.

g) An increase in the emerging drive torque for the pitching of the rotor-blade, resulting from the force of gravity and perhaps by aerodynamics, is effected by the generator-load of the wind turbine. Therefore, in case of a disturbance of the pitch system, the braking of the rotor is assisted by the generator load in accordance with the characteristic curve, and in the case that no power can be fed into the grid, it is assisted by a damp-load or an energy storage, which are connected to the generator-converter system. This equipment can be placed directly on the link of the converter or between the converter and the generator, or on the grid side.

BRIEF DESCRIPTION OF THE DRAWINGS

Design examples of the invention as a pitch system are shown in the drawings and will be described in detail below.

Shown in drawings.

Components of FIGS. 1-3 show the arrangement with a brake; the braking function is self-activated when power is not available. The arrangement shown in FIG. 4 is for a brake type that has to be energized for the braking function.

Components of FIGS. 1-4 in the first/top view (which does not show certain components contained in the second/bottom view) are connected to other components of the second view (which analogously does not show certain components contained in the first view). The two views show different aspects/components of the device.

DETAILED DESCRIPTION OF THE PREFERRED EMBODIMENT

An additional emergency regulation of the rotatable mounted rotor blade 29 on the hub is achieved by switching off a solenoid 14. Therefore the end of the shaft of an actuator 13 has a holding brake 10 with a friction-lining 17, which is fixed by screws 10.1 to a flange 12. Furthermore, the brake 10 includes a manual release lever 11 with a small spring 19, as shown in FIG. 1, pulling with a low force to neutral position.

The flange 12 is rotatable connected to the housing of the actuator 13, using a fixed connection 24. By rotation of the flange plate 12, a small rotation angle on the housing of the holding brake 10 is released.

Figure 2:
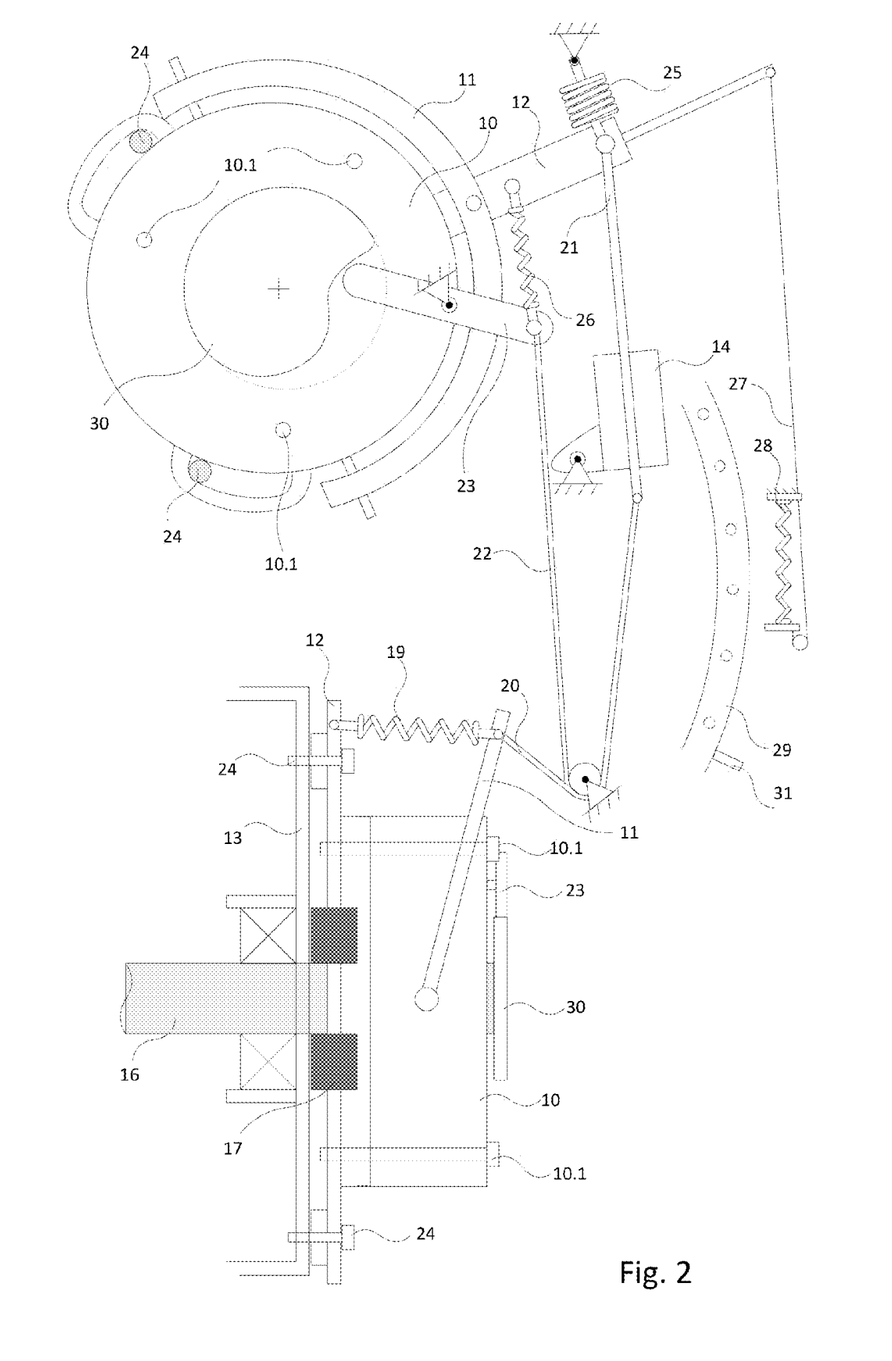
FIG. 2 shows the side- and sectional view of the device for deceleration of a wind turbine in case of emergency in status, manual release activated, after switch-off of the solenoid.

On malfunction of the emergency system, the solenoid 14, which blocks the rotation of the housing of the holding brake 10, is switched off and pulls, via the strong spring 25 and the connection 21, the manual release lever 11 to position "active" (FIG. 2), provided a turn to vane position is needed and in case the electrical opening of the holding brake 10 fails and the holding brake 10 blocks the motor shaft 16, or one or more actuators 13 don't generate a torque. During a rotary movement of the motor shaft 16 into vane direction, and the closed braking pad 17 of the holding brake 10, the housing of the holding brake 10 is rotated at a small angle by the motor shaft 16. This rotation angle is used to hold a rocker lever 23 in position "neutral" by means of a cable pull 22 and to flip by spring tension, while pulling the manual release lever 11 of the holding brake 10 in position "released" by an additional cable. At failure-free operation the rocker lever 23 is held out of reach of the carrier 30 by means of an auxiliary spring 26. Provided that the direction of the counter-clockwise rotating carrier 30 doesn't change, this position is maintained until a mechanical end position probe 28 detects the vane position of the rotor blade 29 via end-stop 31 on the rotor blade 29 and the manual release lever 11 is pulled into neutral position against the spring force with the cable 27. Thus the redundant release of the holding brake 10 is deactivated making the holding brake 10 electrically controllable only.

Figure 1:
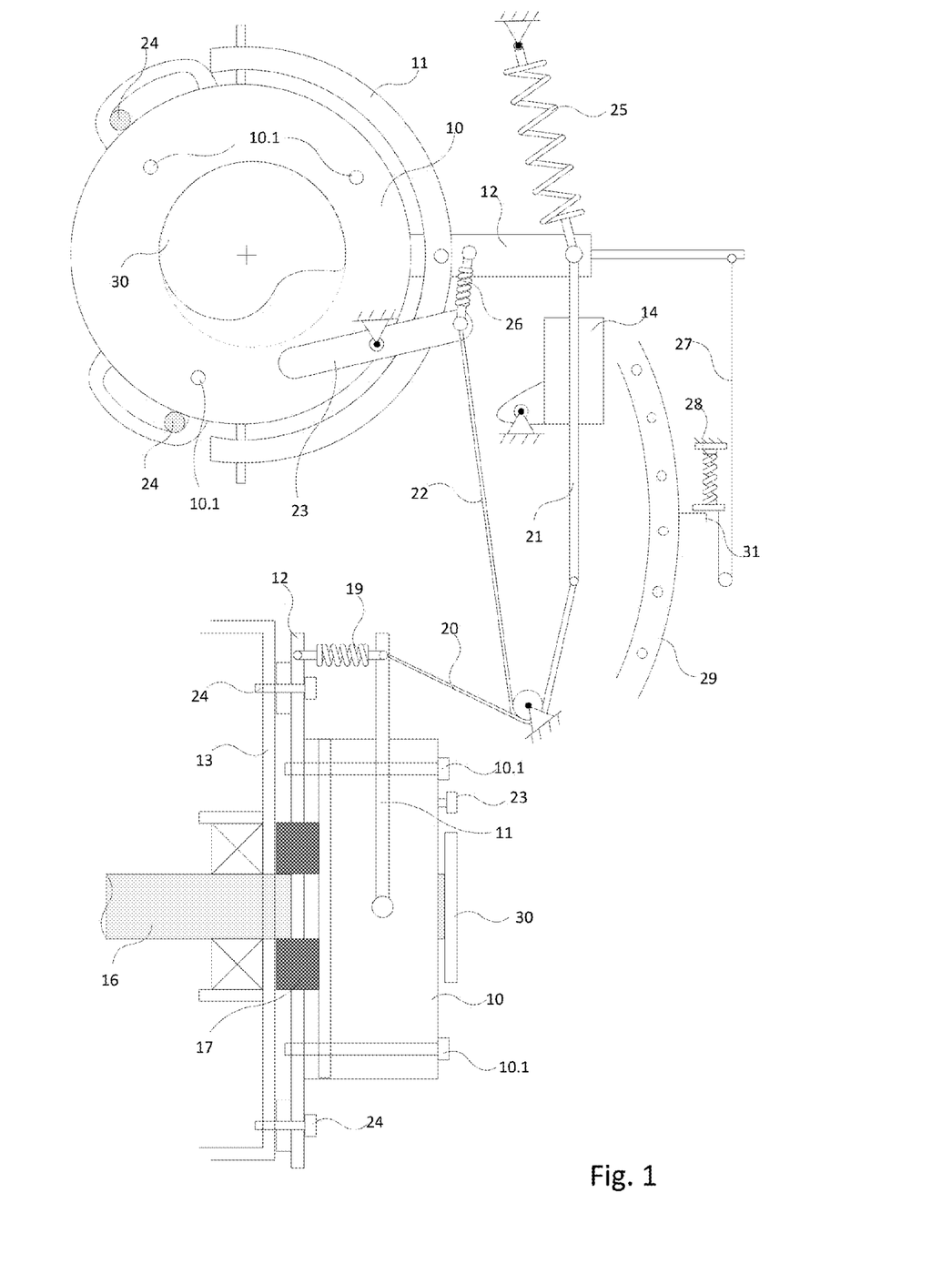
FIG. 1 is a combined view of the side- and sectional view of the device for deceleration of a wind turbine in case of an emergency situation in status, manual release set to neutral, via an end-stop at the rotor-blade in vane position, and correlating the position with energized solenoid.
Figure 3:
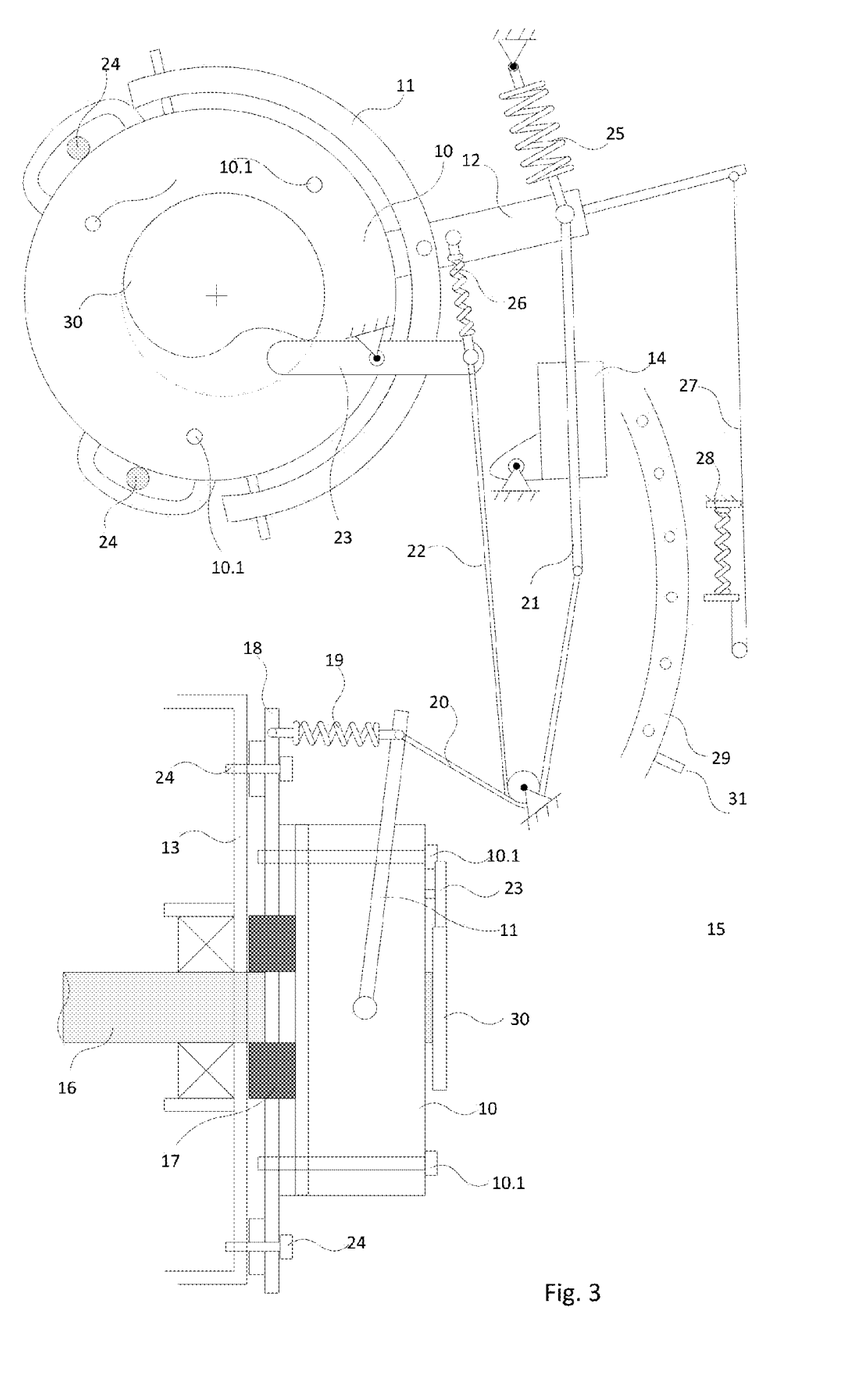
FIG. 3 combines the side- and sectional view of the device for deceleration of a wind turbine in case of emergency in status, rocker lever activated, the resetting of the manual release lever to "neutral" begins, when the shaft is rotating into the direction of operating position

If the rotor blade 29, and with that the motor shaft 16, rotate in the direction of working position, the carrier 30 rotates in a clockwise direction, the carrier 30 activates the resetting of the rocker lever 23, and by pulling the cable 22 the strong spring 25 is tensioned again, and the small spring 19 pulls the manual release lever 11 into neutral position, as shown in FIG. 1. An inclined position of this function is shown in FIG. 3. At the same time the housing of the holding brake 10 is rotated (clockwise) again into the position in which the active solenoid 14 can block it from rotating. The rocker lever 23, pulled by the auxiliary spring 26, is again located outside of the engaging area of the spinning carrier 30 rotating with the motor shaft 16. Consequently the holding brake 10 can be opened redundantly by the torque of the drive 13 with the motor shaft 16 or by torque from the force of gravity and in addition, if applicable, by the aerodynamics at the blade axis of rotor-blade 29.

For friction-prevented rotation of the rotor blade, with the passive brake system, the manual release lever 11 is locked in the neutral position, e.g. for maintenance or transport, in the version with the active brake 10, the position of the pressed anchor-plate 33 is lockable. This prevents an accidental release of the motor shaft 16.

For releasing of the holding brake the following additional options are provided:

a) The manual release lever 11 is moved in such a way that only about 90% braking torque is being reduced. Thus the twist of the holding brake 10 is maintained, as long as the rotational direction of the motor shaft 16 does not change. When setting the overall mechanics of the holding brake 10, it is necessary that the friction lining 17 does not fully release, and thus a small torque on the housing of the holding brake 10 remains, which holds the manual release lever 11 in the released position.

b) As a variation an additional spring-brake (auxiliary brake) is used, whose torque is set to a small value and whose housing is connected to the holding brake 10 as main brake 10. The auxiliary brake is not mechanically opened when a failure occurs. Thus, upon rotation of the motor shaft 16 in the direction of vane position, the housing of the main brake 10 is held in position "manual release lever activated". When changing the rotational direction, the housing of the brake 10 is turned to the direction "brake lever neutral position" whereby the main brake 10 closes, unless the electrical excitation is switched on. This enables the rotation of the motor shaft 16 into the direction of vane position. A rotation of the closed brake towards working position keeps the brake closed and holds the current position.

c) By using an active brake, a forcibly function to open and close of the holding brake 10, can also be achieved. This type closes the brake-pad 17 on activation and opens at power-off. For this purpose, closing the friction linings 17 is carried out by spring force when a rotation into working position is executed, and as soon as arrived at vane position. The detection and triggering of mode "arrest rotor blade rotation into direction working position" or "hold in vane position" is also realized by a solenoid, and achieved depending on direction of the rotational movement of the holding brake housing 10, and by the release of rocker lever 23. The pitch system that regulates the input power of the rotor by a stall at the rotor blades 29, uses the same mode of operation, and then holds the rotor blades 29 in the control range with the least wind energy on the rotor blades 29 and rotor rotation affecting them.

Using an active or a passive holding brake 10 results in a similar operation of the device, but with the difference that for a passive holding brake 10 a manual release lever 11 is needed, that releases the braking, and using an active holding brake 10 requires the closing of the friction lining 17 to the brake hub 33 by an additional device.

When adjusting the rotor blades 29 it will be utilized, that during one revolution of the rotor an emerging torque, through wind and gravity of the rotor blade 29, is detected on each rotor blade 29, which occurs alternately once towards working position and back in the direction of vane position, while the rotor-blades 29 are designed accordingly, that its centre of inertia is outside of the rotor-blade centre.

The present invention shall be seen as a complement to known safety devices, where in case of failure, in which one or more actuators 13 don't deliver a torque, anyhow let the correspondingly affected rotor-blade 29 gradually turn towards vane position and thus the risk of damaging the wind turbine due to use of emergency equipment is considerably reduced compared to state of the art technology.

Figure 4:
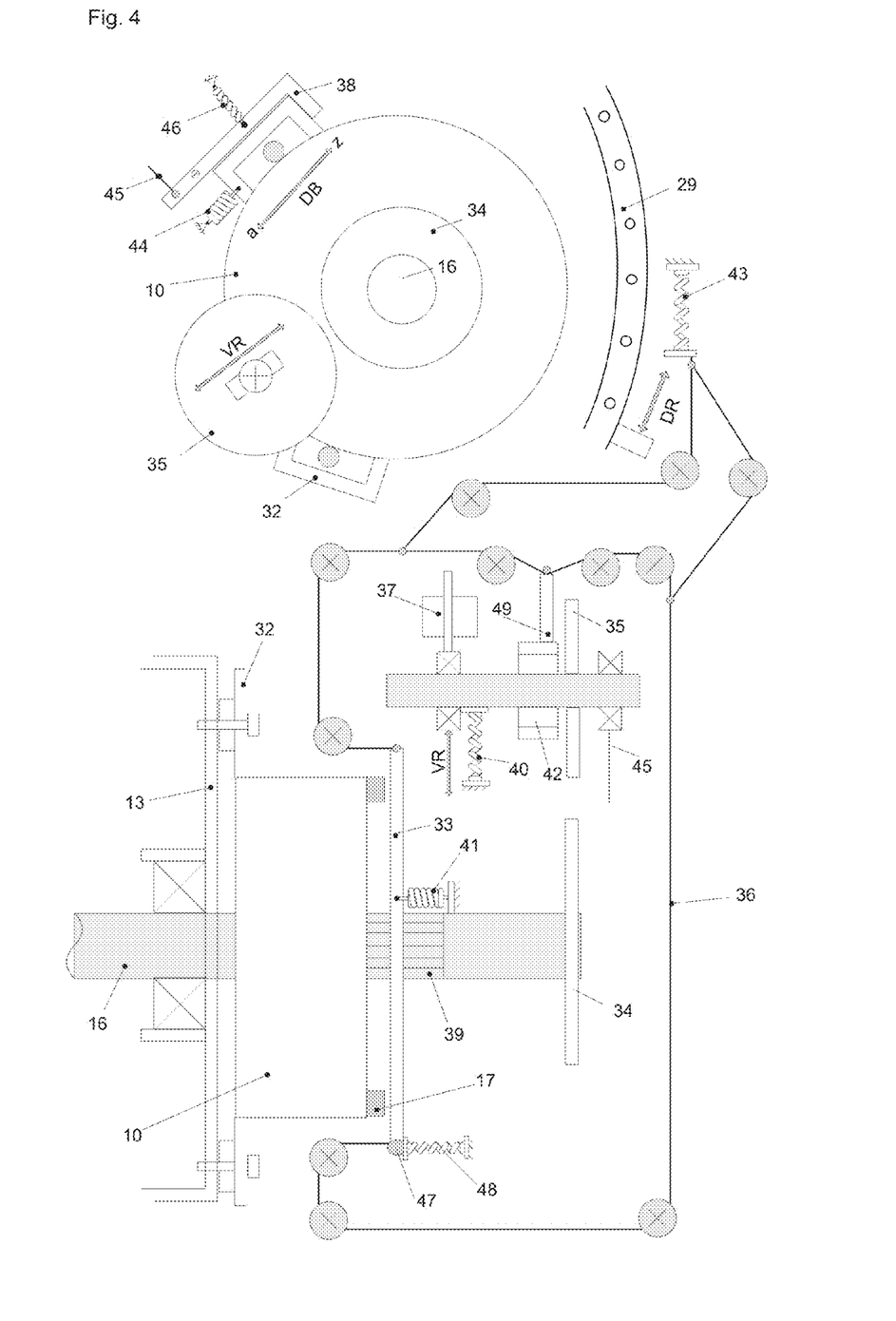
FIG. 4 is a combined view of the side- and sectional view of the device for deceleration of a wind turbine in case of emergency with an active brake.

The design, construction and function of a version using one or more active holding brakes 10 in the drive-train for a rotor-blade 29 is described below.

In case of malfunction, which does not allow giving torque by one or more actuators 13 on the drive train to a rotor blade 29, the brake/s 10 will no longer be controllable, and therefore blade 29 will swing back and forth between aerodynamic deceleration and aerodynamic acceleration at each revolution of the rotor. Consequently there wouldn't be a rotor-blade pitching for continuous reduction of the rotor speed (no more aerodynamic deceleration of the rotor). To resolve this, each of the existing actuators 13 has a flange 13 and on the rotating shaft 16 there is arranged either a gear 34 or a friction wheel 34, in or on which another outer wheel 35 can dip or can be pressed on radial, and thus a rotational movement can be absorbed. During normal operation, the displaceable outer wheel 35 is held out of contact with wheel 34, by means of a lifting or pushing magnet 37, which is connected to the rotation of the rotor blade 29. The contacting of the movable gear 35 by spring force of spring 40 happens as soon as it is no longer held by magnet 37. A detected error also causes the housing of the holding brake 10 to be released at a slight angle by the release of the locking lever 38, via spring 46, this can be carried out with the same electro-magnet 37, which sets the movable gear 35 free and thus leading to a frictional engagement of wheel 35 to wheel 34. If there is no error in the pitch system, the locking lever 38 is kept by cable 45 which is tensioned by the pulling solenoid 37, and thus preventing rotation of the brake housing 10, and leading to default behaviour of the electromagnetic brake. Therefore the disconnection of electromagnet 37 causes, that a force-fit or form-fit connection is done to motor shaft 16, and a possible rotation of the brake housing 10 with a defined angle of rotation is enabled, which can be mechanically detected from the torque direction of the rotor blade, hence brake 10 is mechanically controlled. In addition to the mechanical detection, a technical measurement detection is possible with the disadvantage that electronics are required.

The modes of operation are:

a) Rotating the rotor blade 29 towards working position and b) rotating the rotor blade 29 towards vane position, resp. in the direction causing a reduction of wind power generation.

In case a) a possibly originated rotation of motor shaft 16 in the direction of working position results in a pulling of brake-hub 33, which is caused via lever 49 connected by cable 36 with displacing wheel 35, and thus the brake hub 33, which is form-fit slidable at gearing 39, is pulled against friction pad 17 which is associated with brake housing 10, and consequently spring 41 is tensioned. With the closing of the brake pad 17 a small rotation of the brake housing 10 to end stop DBz happens, and then motor shaft 16 is slowed down. Therefore the cable 36 has an sliding connection 47, as sliding contact 47 with the shaft 16 of the rotating brake hub 33, and the sliding contact is released again, by means of the spring 48 after the manual brake-lever 49 is no longer pulling the cable 36, and thus brake hub 33 is no longer pressed against friction lining 17.

In order that the rotation of the brake housing 10 can happen, the housing of holding brake 10 is released simultaneously with the disconnection of magnet 37 from a position that is locked against rotation. In an error-free system, this locking is provided by means of a locking lever 38, which puts tension on spring 46, by pulling the solenoid 37 via cable 45, and it engages the locking lever 38 at the brake flange 32 resp. brake housing 10 and thus, with energized solenoid 37 and deactivated connection of wheel 34 and 35, no rotation of the brake housing is possible. Now the rotor blade 29 cannot rotate in the direction in which an increase torque would act on the rotor by the wind. During operation without interference the brake operates according to state of the art technology.

When, according to case b), rotor blade 29 rotates into direction of vane position resp. in the direction where lower wind power is generated, the clamping or adjusting mechanism for activating holding brake 10 is released again and the brake hub 33 is, by at least one spring 41, no longer pressed against the brake pad 17. This is done by reversing the direction of rotation of the connected wheel 35 by rotating the position of brake housing 10 via the closed friction pad 17, enabling a rotary motion of wheels 34 and 35, thus eliminating the tension of cable 36 and brake hub 33 disengages again from brake pad 17 via spring 41. A tension spring 48 may revoke the sliding motion of the point of action, thus let brake hub 33 rotate freely. As long as wheel 34 rotates with wheel 35 and with the, via the freewheel 42, associated winding device for the traction cable 36 in this direction, cable 36 remains in a position in which the manual brake lever 49 is not actuated by free wheel 42 and free wheel 42 allows further rotation of sliding wheel 35 after release of brake hub 33. Thus the rotor blade 29 is released for a rotation, in the direction of position for aerodynamic deceleration of the rotor. Brake lever 33 remains in neutral position until a new cycle begins. Even in the event of failure of all rotor-blade pitch systems at a wind turbine of the present invention, the rotor is still slowed down to a lower rotational speed.

So that there is no hard impact of a freely rotating rotor blade 29 in the vane position, a rotor blade end position spring 43 is proposed, in order to perform a mechanical closing of the brake as soon as the blade 29 has reached a predefined area. A mechanical sensor identifying this section, actively pulls or pushes the brake lever 33 and rotor-blade 29 will be stopped. The stop takes place, for example by shortening rope 36 for brake activation. Advantageously a damper is used that, for example, after one second, and after rotor blade 29 has been slowed down, releases cable 36 again.

Until the restart of the pitch-system to normal mode without an error, a turning of each rotor-blade 29 in the direction of working position is prevented by the brake torque.

This function of the blocking of an active brake 10 can also be used advantageously, to secure rotor blade 29 for transport, maintenance and service without a power source, by pressing the brake hub 33 against friction lining 17 by mechanical force.

As soon as the pitch-system is in an undisturbed state again, solenoid 37 is activated which brings the shifting wheel out of contact. Simultaneously, locking lever 38 is actuated for fixing brake housing 10 by cable 45 against spring 46. Holding brake 10 is activated electrically, so that the brake housing 10 can fully rotate into neutral position and locking mechanism 38 is able to lock, and with a short time of actuator torque, the normal position of the brake housing 10 is reached, in which the locking-device 38 can engage. A tension spring 44 on brake housing 10 assists the movement of brake housing 10 into neutral position. The actuator 13 can return to normal operation. The neutral position of brake adjustment and/or of the displacement wheel 35 is advantageously monitored by a sensor within the pitch- or control system.

It is self-evident that cables 36, 45 are replaceable by rods.

LIST OF REFERENCE NUMERALS

10—holding brake, main-brake, brake-housing
10.1—screws
11—hand-lever
12—flange
13—actuator-motor, drive, motor-flange, servo-motor, rotor blade drives (seite1)
14—solenoid
15—sliding device
16—motor-shaft
17—friction lining,
19—light spring
20—rope
21—connection
22—control-cable, cable
23—rocker-arm, rocker-lever
24—connection
25—strong spring
26—assistance-spring
27—cable
28—end-position sensor, end-position probe
29—rotor-blade
30—cam, carrier
31—blocking device, end stop
32—brake-flange
33—brake-hub with toothing, brake-lever
34—toothed wheel/friction drive on motor-shaft
35—outer relocatable wheel
36—rope
37—solenoid, lifting-magnet
38—lock-pin lever
39—toothing
40—spring
41—spring
42—freewheel
43—spring at rotor-blade vane-position
44—spring at brake housing
45—rope,
46—spring
47—sliding contact,
48—spring
49—brake lever
VR—outer relocatable wheel
DR—rotor-blade rotation
DB—brake rotation
DBa—rotation "brake free"
DBz—rotation "brake closed"

The invention claimed is:

1. A method for slowing down a wind turbine in case of emergency comprising:
adjusting one or more rotor blades of the wind turbine with power control based on the principle of pitch control or active stall control; where each of the one or more rotor blades is equipped with at least one actuator that continuously compares the torques of the respective actuators against each other, as well as, compares stored threshold values for each actuator; and one or more holding brakes are applied, in order to hold the position of each of the one or more rotor blades where friction is used as the braking method; and
operating a redundant emergency apparatus for each of the one or more rotor blades to close or release said one or more holding brakes (10) of each of the one or more rotor blades in a mechanical fashion without a power supply, said redundant emergency apparatus stops each of the one or more rotor blades (29) from rotating, or releases it, depending on a predetermined turning direction of said one or more rotor blades; opens or, as the case may be, keeps open said one or more holding brakes, in the case that there is a rotation in the direction of reduced wind energy on the rotor; and in the case of an unwanted direction of rotation, closes or, as the case may be, keeps closed said one or more holding brakes.

2. Method according to claim 1:
characterized in that,
when the one or more holding brakes is actuated in the absence of power, the detection of the actual direction of torque arising from said one or more rotor blades takes place by the turning of a holding brake housing so that torque in the direction of a work position will result in a manual release lever being held in a neutral position.

3. Method according to claim 1,
characterized in that,
for said one or more holding brakes (10) a redundant and mechanically activated closing of said one or more holding brakes (10) is performed, after the activation by an end stop (31) which is linked to the rotation of said one or more rotor blades (29), and used for the detection of the position via a mechanical end-position sensor (28) of each of the one or more rotor blades (29) with low wind-energy intake.

4. Method according to claim 1:
characterized in that,
via a solenoid (14) or any kind of sliding device (14), which after deactivation or release, releases a locking lever which allows the turning of a holding brake housing, or that the said one or more holding brakes (10) open autonomously in the direction of reduced energy generation, after release of an interlock, and the therewith possible turning of the holding brake housing, and the activation of a connected manual release lever (11) by the torque of the at least one actuator (13).

5. Method according to claim 1: characterized in that,
via a solenoid (37) or a sliding device (37), which, after deactivation or release, releases a locking lever (38) or deadlock (38), which causes the holding brake housing (10) to turn, and a friction lining (17) is active after an outer wheel (35) is turned by a friction wheel (34) in the direction, in which no freewheel (42) takes effect, thus causing a manual brake lever (49) to pull on a rope (36), and that after reversion of the motor-shaft (19) direction of rotation, a hand brake lever (49), due to the change of rotational direction of the outer wheel (35), loosens the tension on the rope (36) thus opening the friction lining (17) by a first spring (41),
and the housing of the holding brake (10) is turned again by a second spring (44) into the position of brake open (DBa), and that after activation of the solenoid (37) the locking lever (38) is pulled by a cable (45) and again consequently fixing the holding brake (10) against turning.

6. Method according to claim 1: characterized in that,
the slowing-down of the rotor even in case of mains failure can be achieved by keeping up the load on a generator, at least temporarily.

7. Method according to claim 1
characterized by the following features:
  in case of malfunction a deactivation of a solenoid (14) at said one or more holding brakes (10) in a passive state is executed, and thus releasing a small angle of rotation at a holding brake housing, whereat a rotational movement in the direction of a vane position and turn of the holding brake housing causes a mechanically enforced release of said one or more holding brakes, and thus enabling the rotation of said one or more rotor blades (29) in the direction of the vane position,
  a rotation of said one or more holding brakes (10) in a closed state in direction of working position, keeps the one or more closed holding brakes (10) in a closed state closed, and holds the current position,
  in the case that said one or more rotor blades (29) generate a rotational movement in direction of working position, said one or more holding brakes (10) that are pivoted are already being closed again after a small turn, thus stopping said one or more rotor blades from turning,
  in the case that the at least one actuator (13) operates against said one or more holding brakes (10) that are unreleased, a converter deactivates a locking lever independently, which has blocked the mechanical releasing of said one or more holding brakes (10), therefore the solenoid (14), which in normal operation blocks the angular turn of said one or more holding brakes (10), will be switched off, whereby, also via a motor torque in direction of the vane position, a mechanically enforced releasing of said one or more holding brakes (10) occurs, and in this case pulls a manual release lever (11) permanently into "open" position via the motor torque, thus accomplishing that said one or more holding brakes (10), which cannot be released electrically, cannot block the rotor blade (29) in the direction of the vane position,
  in the case that the mains supply is ensured, the solenoid (14) is activated in the area of the vane position, and a turning of said one or more holding brakes (10) is blocked, whereby the manual release lever (11) is kept in neutral position via a spring (25), and said one or more holding brakes (10) then being only releasable via the solenoid (14) at said one or more holding brakes (10),
  For an automatic start of the wind turbine the solenoid (14) blocks the possible rotational angle of said one or more holding brakes (10) and the manual release lever (11) remains in neutral position, thus releasing of said one or more holding brakes (10) is only done electrically.

8. Method according to claim 1 characterized in that,
at failure-free operation, when using at least one active holding brake (10), a movable outer wheel (35) is held outside the contact with a friction wheel (34), via a lifting or pushing magnet (37), and the movable outer wheel (35) is in contact with the respective one or more rotor-blades (29) and the friction wheel (34) is fixed on the motor shaft (16) of the at least one actuator (13) and in frictional connection to a brake-hub (33) and in case of an error a contact to the movable outer wheel (35) by force of a first spring (40) is realized once the first spring is not held any longer by the solenoid (37), and simultaneous the brake housing (10) is released at a slight rotational angle, and the solenoid releases the movable outer wheel (35), leading to a contact of the movable outer wheel (35) with the friction wheel (34), which causes a frictional or interlocking connection to the motor shaft (16); and
in the operation mode the one or more rotor blades (29) rotates in a direction of a working-position, allowing the rotation of the motor shaft (16) in this direction causing a pull of a brake-lever (33) or brake-hub (33) by a cable (36), which after deflection closes the friction lining (17) of the holding brake (10), and that in the operation mode one or more rotor blades (29) rotates in the direction of lower energy generation by the one or more rotor blades, the holding brake (10) is released, by changing the direction of rotation of the contacted movable outer wheel (35), the housing of the holding brake (10) executes a rotation angle into a neutral position, and simultaneous a second spring (41) on the brake housing (10) pulls the brake housing (10) back into the neutral position, as soon as the friction lining (17) is released and thereby the rotation of the one or more rotor blades (29) have been released into the direction of aerodynamic braking.

9. Method according to claim 8 characterized in that,
a malfunction of the function check causes a limitation of the maximum pitch-angle, the rotational speed of the rotor, or a slow-down of the wind turbine.

10. Apparatus including a redundant emergency apparatus for the execution of the method to slow down a wind turbine in a case of emergency by pitching rotor blades (29) for the wind turbine with power control according to the principle of pitch-control or active stall control, and for each of the respective rotor blades (29) having at least one actuator (13) and at least one holding brake (10) for keeping the position of the respective rotor blades (29), characterized in that,
the at least one actuator (13) is connected with a holding brake (10), equipped with friction lining (17) and a flange (12), the housing of the holding brake (10) is adjustable to a certain angle;
the holding brake (10) features a manual release-lever (11), a manual brake-lever, and the flange (12), wherein the flange has a connection (21) to a sliding device (14), and a strong spring (25) is arranged in the opposite direction of the connection device (21), and additionally a first cable (27) mechanically coupling with an end-position probe (28), which is installed next to a blocking device (31) of the respective rotor blades (29);
a cam (30) of the at least one actuator (13), is arranged in the range of a rocker lever (23), which is connected by a second cable (22) to the connection device (21), and an auxiliary spring (26), is arranged between the rocker-lever (23) and the flange (12);
each of the one or more rotor blades is equipped with the at least one actuator that continuously compares the torques of the respective actuators against each other, as well as, compares the stored threshold values for each actuator;
the at least one holding brake is applied, in order to hold the position of each of the one or more rotor blades where friction is used as the braking method; and
the redundant emergency apparatus for each of the one or more rotor blades closes or releases said one or more holding brakes (10) of each of the one or more rotor blades in a mechanical fashion without a power supply, and which said redundant emergency apparatus stops each of the one or more rotor blades (29) from rotating, or releases it, depending on a predetermined turning direction of said one or more rotor blades; opens or, as the case may be, keeps open said one or more holding brakes, in the case that there is a rotation in the direction of reduced wind energy on the rotor; and in the case of an unwanted direction of rotation, closes or, as the case may be, keeps closed said one or more holding brakes.

11. Apparatus according to claim 10 characterized by following features:
the holding brake (10) has a friction lining (17) in connection with a motor shaft (16) of the at least one actuator (13), and the holding brake (10) is fixed on the flange (12) with screws (10.1), whereby the flange (12) has an end which is overlapping the housing of the holding brake (10), at which the auxiliary spring (26) operates in the opposite direction of the strong spring (25), the connection device (21) connects with the sliding device (14) and the first cable (27), which the first cable has an end connected to an end-position probe (28);
a disk-shaped carrier (30) has a bulge, which corresponds to a rocker lever (23) connected with the holding brake (10), whereat the rocker-lever (23) has the auxiliary spring (26), which is connected to the flange at a second end (12); and
a rope (22) attached to the anchorage point of the auxiliary spring (26) at the rocker lever (23), which is linked to the connection device (21);
the holding brake (10) has a manual release lever (11) with a small spring (19) pulling with low force towards neutral position;
the flange (12) is rotatably connected to the housing of the actuator (13) with at least one fixed connection (24), thus enabling the holding brake housing (10) for a certain angle of rotation, and the rotor blade (29) has the blocking device (31) corresponding with the end-position probe (28).

12. Apparatus according to claim 11, characterized in that, the hand brake lever (49) has a freewheel (42) that is connected with the outer wheel (35).

13. Apparatus according to claim 10 characterized by following features:
the holding brake (10) is an active holding brake;
each of the existing at least one actuators (19) on the motor shaft (16) located behind the holding brake (10), has a friction lining (17) on the housing;
at the motor shaft (16) there is located a slidable brake-hub (33) connected by gearing (39) to the motor shaft (16) and first and second springs (41, 48), and furthermore containing either a cogged wheel (34) or a friction wheel (34), which is radially contacted or pressed on an outer wheel (35), thus enabling the outer wheel (35) to take a rotational movement;
either the cogged wheel (34) or the friction wheel (34) has a connection to the rotor blade (29);
wherein the outer wheel (35) is held outside of the influence of either the cogged wheel (34) or the friction wheel (34) via a solenoid (37), and as a counterforce to the solenoid (37) there is a third spring (40) attached;
wherein a first rope (36) has contact to at least one spot at the brake-hub (33), and is guided by the movable and rotatable outer wheel (35) and redirection points, and the first rope (36) is attached with a second rope (36), which is connected to the brake-hub (33) and with the rotor-blade end-position spring (43);
at the brake-housing (10) a locking lever (38) is arranged, having a fourth spring (46) and a third cable (45) guided between the locking lever (38) and external the outer wheel (35), and is tensible by the solenoid (37), and that the rotor-blade end-position spring (43) is in correspondence with the blocking device of the respective rotor blades (29).

* * * * *